United States Patent
Price et al.

(10) Patent No.: US 12,010,443 B2
(45) Date of Patent: Jun. 11, 2024

(54) SYSTEMS AND METHODS FOR SELECTIVELY MODIFYING GATING RATE IN SINGLE PHOTON AVALANCHE DIODES

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 17/505,507

(22) Filed: Oct. 19, 2021

(65) Prior Publication Data

US 2023/0123494 A1    Apr. 20, 2023

(51) Int. Cl.
*H04N 25/59*     (2023.01)
*H04N 25/587*    (2023.01)
*H04N 25/63*     (2023.01)

(52) U.S. Cl.
CPC ........... *H04N 25/59* (2023.01); *H04N 25/587* (2023.01); *H04N 25/63* (2023.01)

(58) Field of Classification Search
CPC ...... H04N 25/59; H04N 25/587; H04N 25/63; H04N 23/71; H04N 23/741
See application file for complete search history.

(56) References Cited

U.S. PATENT DOCUMENTS

| | | | |
|---|---|---|---|
| 10,386,487 B1* | 8/2019 | Wilton | G01S 7/4865 |
| 2015/0163429 A1 | 6/2015 | Dai et al. | |
| 2019/0026872 A1* | 1/2019 | Lee | H04N 9/68 |
| 2019/0331771 A1* | 10/2019 | Iguchi | G01S 7/4816 |
| 2020/0036918 A1* | 1/2020 | Ingle | H01L 27/14625 |
| 2021/0165083 A1* | 6/2021 | Fine | G01S 17/18 |
| 2023/0015431 A1* | 1/2023 | Mandai | H01L 31/02027 |

OTHER PUBLICATIONS

Morimoto, et al., "A Megapixel Time-Gated SPAD Image Sensor for 2D and 3D Imaging Applications", in Journal of preprint arXiv:1912, Dec. 30, 2019, 11 Pages.
"International Search Report and Written Opinion Issued in PCT Application No. PCT/US22/038415", dated Oct. 27, 2022, 11 Pages. (Ms# 410531-WO-PCT).

* cited by examiner

Primary Examiner — Sinh Tran
Assistant Examiner — Zhenzhen Wu
(74) Attorney, Agent, or Firm — Workman Nydegger (57) ABSTRACT

A system for selectively modifying gating rate in a single photon avalanche diode (SPAD) is configurable to access first frame metadata associated with a first image frame. The first image frame is captured by performing a first plurality of gate operations to configure the SPAD array to enable photon detection over a frame capture time period. The first plurality of gate operations is performed at a first gating rate such that the first plurality of gate operations comprises a first quantity of gate operations performed over the frame capture time period. The system is further configurable to define a second gating rate based on the first frame metadata and capture a second image frame by performing a second plurality of gate operations to configure the SPAD array to enable photon detection at the second gating rate.

17 Claims, 8 Drawing Sheets

Accessing First Frame Metadata Associated With A First Image Frame, The First Image Frame Being Captured By Performing A First Plurality Of Gate Operations To Configure A SPAD Array To Enable Photon Detection Over A Frame Capture Time Period, The First Plurality Of Gate Operations Being Performed At A First Gating Rate Such That The First Plurality Of Gate Operations Comprises A First Quantity Of Gate Operations Performed Over The Frame Capture Time Period

704

Defining A Second Gating Rate Based On The First Frame Metadata

706

Capturing A Second Image Frame By Performing A Second Plurality Of Gate Operations To Configure The SPAD Array To Enable Photon Detection At The Second Gating Rate

*FIG. 7*

SYSTEMS AND METHODS FOR SELECTIVELY MODIFYING GATING RATE IN SINGLE PHOTON AVALANCHE DIODES

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras for facilitating image capture, video capture, and/or other functions. For instance, cameras of an MR system may utilize images and/or depth information obtained using the camera(s) to provide pass-through views of a user's environment to the user. An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

To facilitate imaging of an environment for generating a pass-through view, some MR systems include image sensors that utilize complementary metal-oxide-semiconductor (CMOS) and/or charge-coupled device (CCD) technology. For example, such technologies may include image sensing pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

However, such image sensors suffer from a number of shortcomings. For example, the signal to noise ratio for a conventional image sensor may be highly affected by read noise, especially when imaging under low visibility conditions. For instance, under low light imaging conditions (e.g., where ambient light is below about 10 lux, such as within a range of about 1 millilux or below), imaging sensors may detect only a small number of photons, which may cause the read noise and/or fixed pattern noise to approach or exceed the signal detected by the imaging pixel and decrease the signal-to-noise ratio.

The dominance of read noise and/or fixed pattern noise in a signal detected by a CMOS or CCD image sensor is often exacerbated when imaging at a high frame rate under low light conditions. Although a lower framerate may be used to allow a CMOS or CCD sensor to detect enough photons to allow the signal to avoid being dominated by read noise, utilizing a low framerate often leads to motion blur in captured images. Motion blur is especially problematic when imaging is performed on an HMD or other device that undergoes regular motion during use.

In addition to affecting pass-through imaging, the read noise and/or motion blur associated with conventional image sensors may also affect other operations performed by HMDs, such as late stage reprojection, rolling shutter corrections, object tracking (e.g., hand tracking), surface reconstruction, semantic labeling, 3D reconstruction of objects, and/or others.

To address shortcomings associated with CMOS and/or CCD image sensors, devices have emerged that utilize single photon avalanche diode (SPAD) image sensors. A SPAD pixel is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected.

Separate shutter operations may be performed consecutively and integrated over a frame capture time period. The binary output of the consecutive shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of consecutive shutter operations over a frame capture time period may be counted, and per-pixel intensity values may be calculated based on the counted per-pixel binary output. The per-pixel intensity values may be used to form an intensity image of an environment.

Although SPAD sensors show promise for overcoming various shortcomings associated with CMOS or CCD sensors, implementing SPAD sensors for image and/or video capture is still associated with many challenges. For example, there is an ongoing need and desire for improvements to the image quality of SPAD imagery, particularly for SPAD imagery captured under low light conditions. Furthermore, there is an ongoing need and desire for power-efficient SPAD implementations, particularly for battery-powered devices (e.g., HMDs).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices for selectively modifying recharge clock rates of single photon avalanche diodes (SPAD).

Some embodiments provide a system that includes a SPAD array comprising a plurality of SPAD pixels, one or more processors, and one or more hardware storage devices storing instructions that are executable by the one or more processors to configure the system to perform various acts. The acts include accessing first frame metadata associated with a first image frame. The first image frame is captured by performing a first plurality of gate operations to configure the SPAD array to enable photon detection over a frame capture time period. The first plurality of gate operations is performed at a first gating rate such that the first plurality of gate operations comprises a first quantity of gate operations performed over the frame capture time period. The acts further include defining a second gating rate based on the first frame metadata and capturing a second image frame by performing a second plurality of gate operations to configure the SPAD array to enable photon detection at the second gating rate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are generally directed to systems, methods, and devices for selectively modifying gating rate in single photon avalanche diodes (SPADs).

Examples of Technical Benefits, Improvements, and Practical Applications

Those skilled in the art will recognize, in view of the present disclosure, that at least some of the disclosed embodiments may be implemented to address various shortcomings associated with at least some conventional imaging systems, particularly for imaging under low light conditions. The following section outlines some example improvements and/or practical applications provided by the disclosed embodiments. It will be appreciated, however, that the following are examples only and that the embodiments described herein are in no way limited to the example improvements discussed herein.

As noted above, there is an ongoing need and desire for improvements to the image quality of SPAD imagery, particularly for SPAD imagery captured under low light conditions. For example, challenge associated with image acquisition using SPADs is signal noise brought about by dark current. Dark current (sometimes referred to as reverse bias leakage current) refers to a small electric current that flows through photosensitive devices (e.g., SPADs) even when no photons are entering the device. Dark current can be thermally induced or brought about by crystallographic and/or manufacturing irregularities and/or defects.

In SPADs, dark current can cause an electron-hole pair to be generated in the depletion region and can trigger avalanche events, even when the SPAD is not detecting a photon. Avalanche events brought about by dark current are typically counted as detected photons, which can cause the binary output of a SPAD to include false counts (or "dark counts"). In SPAD imagery, dark counts can cause the intensity values assigned to at least some SPAD pixels to by inaccurately high, which can add noise to SPAD imagery. In some instances, the effects of dark counts are prominent when imaging under low light conditions, contributing to high fixed pattern noise that degrades user experiences. These pixels or groups of pixels, also known as hot clusters, are regions with higher dark current (also referred to as "dark counts") than adjacent pixels.

Accordingly, disclosed techniques may facilitate improved image quality when imaging under low light conditions by selectively modifying the gating rate (or "recharge clock rate," used herein synonymously with "gating rate") of one or more SPADs based on imaging conditions. For example, a system may access metadata associated with an image frame captured using a SPAD array. Based on the metadata, the system may detect a change in imaging conditions (e.g., a change in device temperature, dark count prevalence, illuminance, dynamic range, etc.). In some instances, based on the metadata indicating a change in imaging conditions that satisfies one or more conditions, the system may modify the gating rate used to capture subsequent image frames with the SPAD array.

Using a high gating rate when capturing SPAD imagery under low light conditions can contribute to hot pixels or hot clusters (pixels with high dark current) in resulting SPAD imagery. For example, SPAD pixels of a SPAD array that are prone to produce dark counts will be given more opportunities to do so when a high gating rate is used, resulting in a higher pixel intensity value resulting from the higher dark counts (and contributing to high-frequency noise in the image frame). Furthermore, using a low gating rate when capturing SPAD imagery under lighted conditions can unnecessarily reduce the bit depth of the resulting SPAD imagery. Still furthermore, utilizing a high gating rate may unnecessarily consume system power when capturing scenes with low dynamic range (particularly low light scenes with low dynamic range), whereas utilizing a low gating rate may fail to accurately represent objects when capturing scenes with high dynamic range (e.g., brighter objects may appear underexposed).

Thus, in some instances, when the metadata for a captured SPAD image frame indicates a low (or relatively lower as compared to preceding image frames) scene illuminance or dynamic range for an image frame, the system may dynamically reduce the gating rate for capturing subsequent image frames. Doing so may reduce the number of dark counts obtained from pixels that are prone to producing dark counts, thereby resulting in reduced fixed pattern noise. Reducing gating rate also advantageously reduces SPAD power consumption (e.g., by reducing the number of recharges, shutter operations, or gates performed over the frame capture time period), thereby enabling reduced battery consumption when imaging under low light conditions.

Conversely, in some instances, when the metadata for a captured SPAD image frame indicates a high (or relatively higher as compared to preceding image frames) scene illuminance or dynamic range for an image frame, the system may dynamically increase the gating rate for capturing subsequent image frames. Doing so may attain desirable bit depth for illuminated scenes. Brighter scenes with high dynamic range content may also benefit from alternating long and short exposures, enabling the alternating frames to capture bright and dark portions of the scene.

Furthermore, when a gating rate is updated or modified in accordance with the present disclosure, a non-linear response function for determining photon counts may be utilized to account for the changes in gating rate (e.g., in response to detected scene dynamic range or scene illuminance), as discussed in more detail hereinafter.

Additional or alternative factors may be used to trigger modification of SPAD gating rate. For instance, dark counts are often related to device temperature. Thus, frame metadata may indicate temperature information associated with the capture of the image frame (e.g., temperature of the SPAD(s) during image capture) and the gating rate modification may be affected by detected temperature (or changes in temperature).

Having just described some of the various high-level features and benefits of the disclosed embodiments, attention will now be directed to FIGS. 1 through 7. These Figures illustrate various conceptual representations, architectures, methods, and supporting illustrations related to the disclosed embodiments.

Figure 1:
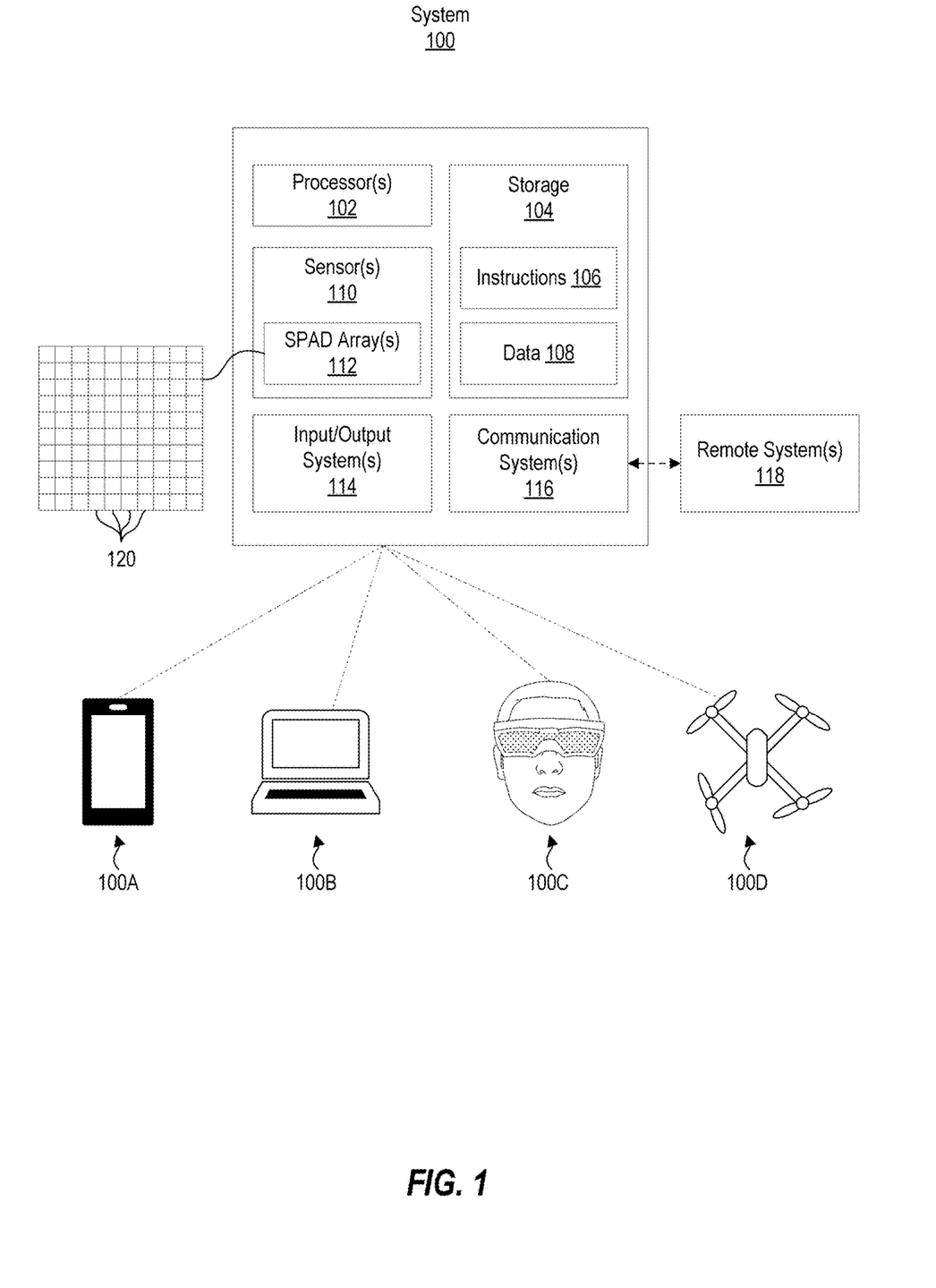
FIG. 1 illustrates example components of an example system that may include or be used to implement one or more disclosed embodiments.

Example Systems and Techniques for Structured Light Depth Computation Using SPADs FIG. 1 illustrates various example components of a system 100 that may be used to implement one or more disclosed embodiments. For example, FIG. 1 illustrates that a system 100 may include processor(s) 102, storage 104, sensor(s) 110, SPAD array(s) 112, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with imaging using SPAD arrays. The actions may rely at least in part on data 108 (e.g., avalanche event counting or tracking, etc.) stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 118 may comprise any combination of software or hardware components that are operable to facilitate communication between on-system components/devices and/or with off-system components/devices. For example, the communications system(s) 118 may comprise ports, buses, or other physical connection apparatuses for communicating with other devices/components. Additionally, or alternatively, the communications system(s) 118 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 may include SPAD array(s) 112. As depicted in FIG. 1, a SPAD array 112 may comprise an arrangement of SPAD pixels 120 that are each configured to facilitate avalanche events in response to sensing a photon, as described hereinabove. After detecting a photon, the SPAD pixels 120 may be recharged to prepare the SPAD pixels 120 for detecting additional avalanche events. SPAD array(s) 112 may be implemented on a system 100 (e.g., an MR HMD) to facilitate various functions such as image capture and/or computer vision tasks.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. Although the present description focuses, in at least some respects, on utilizing an HMD to implement techniques of the present disclosure, additional or alternative types of systems may be used.

Figure 2:
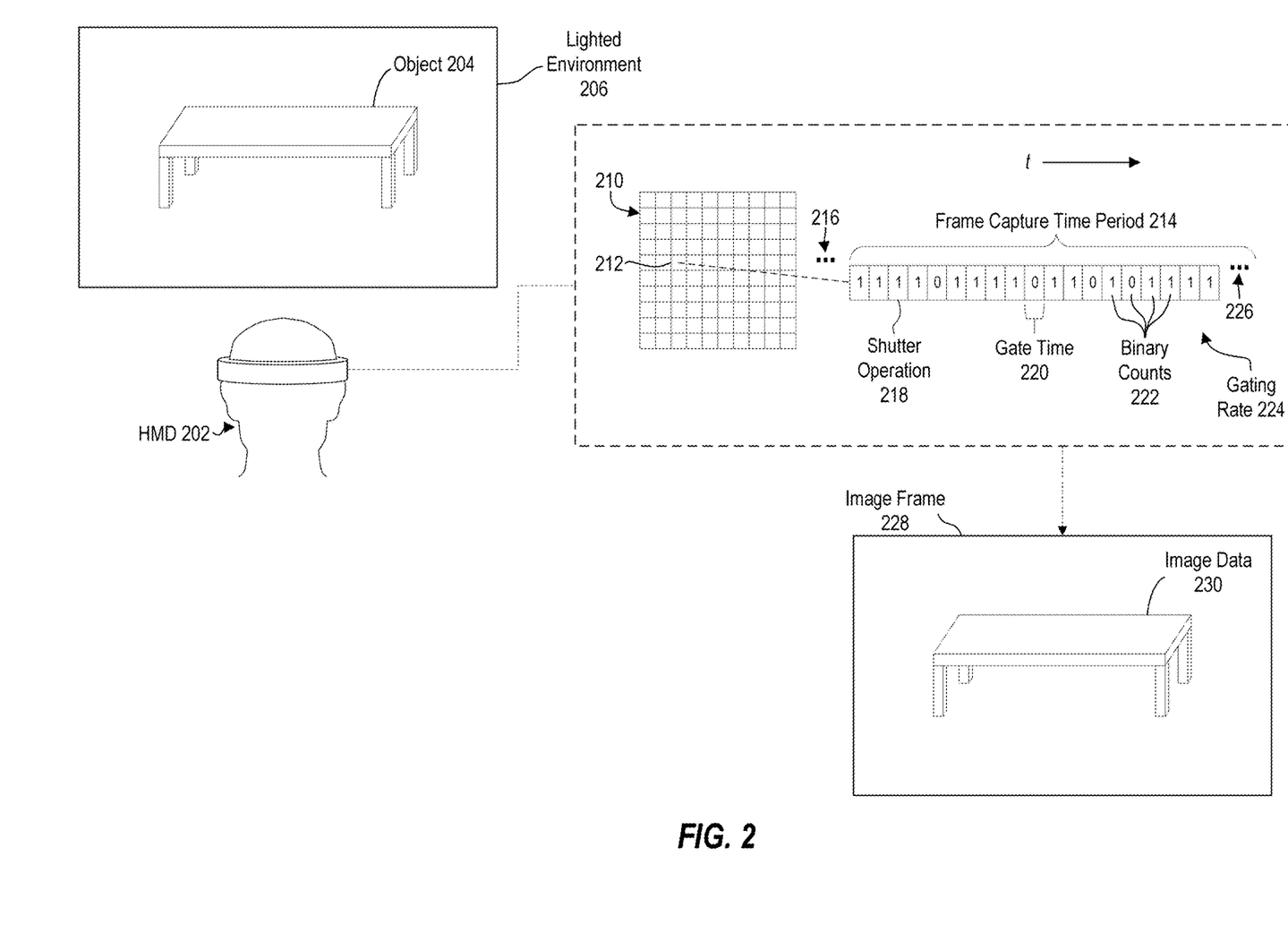
FIG. 2 illustrates an example representation of capturing an image frame of a lighted environment using a single photon avalanche diode (SPAD) array.

Attention is now directed to FIG. 2, which illustrates an example representation of capturing an image frame 228 of an object 204 within a lighted environment 206 using a single photon avalanche diode (SPAD) array 210 of a head-mounted display 202 (HMD 202). The HMD 202 corresponds, in at least some respects, to the system 100 disclosed hereinabove. For example, the HMD 202 includes a SPAD array 210 (e.g., corresponding to SPAD array(s) 112) that includes SPAD pixels (e.g., SPAD pixel 212) configured for photon detection to capture images. Each SPAD pixel of the SPAD array 210, including SPAD pixel 212, is configurable to trigger avalanche events in response to detecting photons. As noted above, the number of detected avalanche events may be used to generate intensity images, such as image frame 228 shown in FIG. 2.

FIG. 2 shows a dashed line extending between SPAD pixel 212 (of the SPAD array 210) and representations various image capture operations that will be described in more detail hereinbelow. FIG. 2 further depicts an ellipsis 216 between the SPAD pixels of the SPAD array 210 and the representations of the image capture operations. The ellipsis 216 indicates that the image capture operations described hereinbelow may be performed using any number of SPAD pixels of a SPAD array 210 (e.g., all SPAD pixels). A single representation of the image capture operations is shown in FIG. 2 (and subsequent Figures) for the sake of clarity and simplicity. FIG. 2 additionally provides a time axis t to illustrate the temporal relationship among the different image capture operations that will be described hereinbelow.

FIG. 2 depicts various shutter operations 218 (or "gate operations") applied by the SPAD pixel 212 of the SPAD array to facilitate image data acquisition for capturing the image frame 228. As noted above, applying a shutter operation to a SPAD pixel configures the SPAD pixel for photon detection by configuring the SPAD pixel to trigger avalanche events in response to detected photons. Thus, the presence of an avalanche event during a shutter operation indicates that the SPAD pixel detected a photon during the shutter operation. Whether a SPAD pixel experienced an avalanche event (and therefore detected a photon) during a shutter operation may be represented by a binary "1" or "0", with "1" indicating that an avalanche event occurred during the shutter operation and with "0" indicating that no avalanche event occurred during the shutter operation. Accordingly, FIG. 2 depicts binary counts 222 associated with each shutter operation 218.

FIG. 2 shows the shutter operations 218 performed over a frame capture time period 214. As noted above, binary counts 222 resulting from consecutive shutter operations 218 may be aggregated (over the frame capture time period 214) to generate per-pixel intensity values for generating an image frame (e.g., image frame 228). The ellipsis 226 indicates that any suitable number of shutter operations 218 may be performed over a frame capture time period to generate an image frame.

In some instances, a predefined number of shutter operations 218 are performed over a frame capture time period 214. For example, when capturing a lighted environment 206, 2,000 shutter operations 218 may be performed over a frame capture time period 214. The rate of performing shutter operations 218 over a frame capture time period 214 may be represented (explicitly or implicitly) as a gating rate 224, or a frequency of performance of shutter operations 218 over time. The shutter operations 218 may thus have a gate time 220 associated therewith, where the gate time 220 (or "gate time period") comprises the duration over which a SPAD pixel becomes configured to trigger an avalanche event (if a photon is detected) before being recharged/reset.

Accordingly, for a given gating rate 224, a certain number of shutter operations 218 will be performed over the frame capture time period 214.

Based on the binary counts 222 obtained via the consecutive shutter operations 218 performed at the specified gating rate 224 over the frame capture time period 214 (and with the corresponding gate time 220 for each shutter operation 218), per-pixel intensity values may be obtained to generate image data 230 of an image frame 228 representative of objects (e.g., object 204) present in a captured environment (e.g., lighted environment 206), as represented in FIG. 2.

Figure 3A:
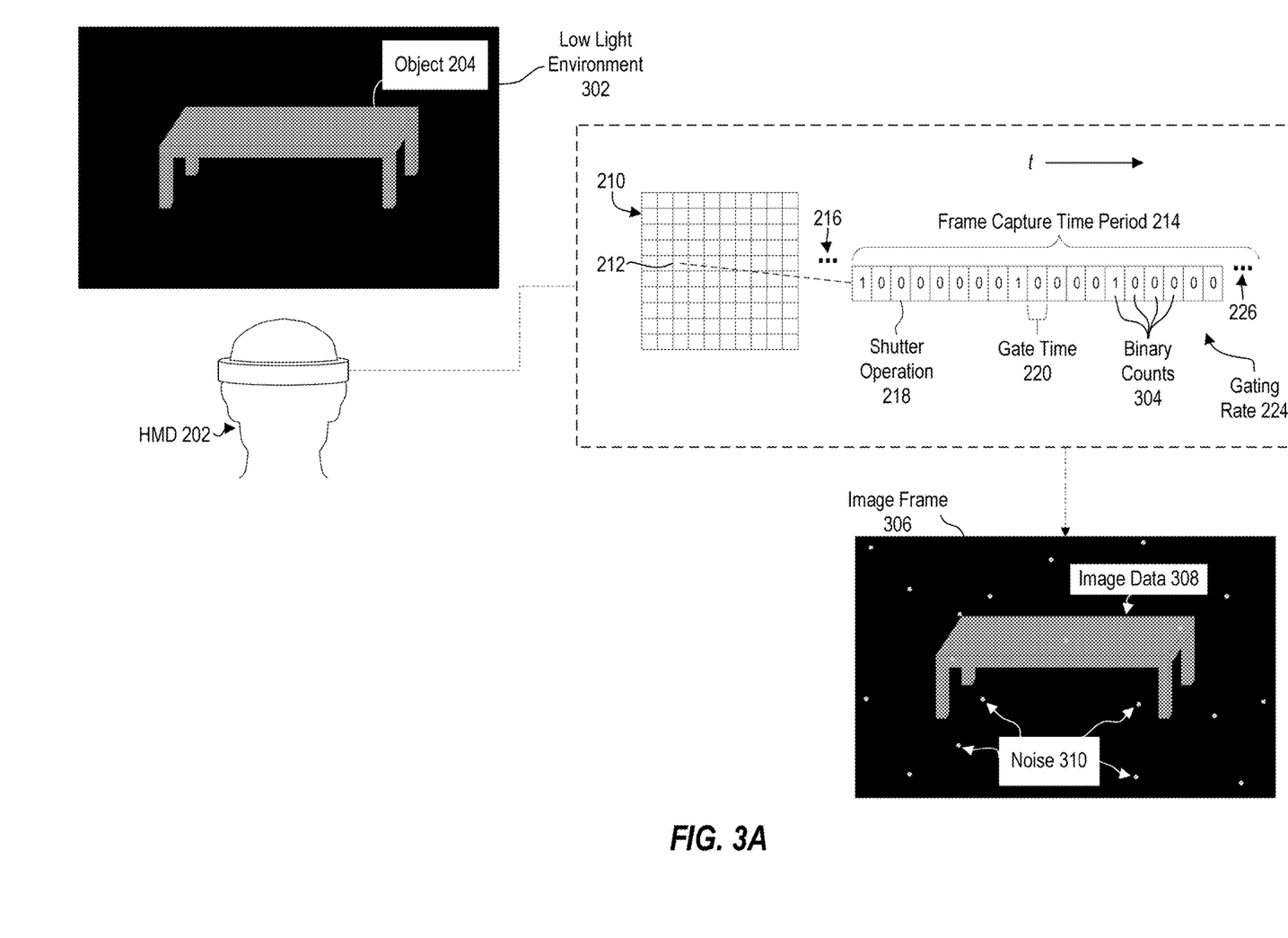
FIG. 3A illustrates an example representation of capturing an image frame of a low light environment using a SPAD array.

FIG. 3A illustrates an example representation of capturing an image frame 306 of the object 204 in a low light environment 302 using the SPAD array 210 of the HMD 202. For instance, a user may have turned off a light source within the lighted environment 206 shown in FIG. 2, resulting in the low light environment 302 of FIG. 3A. As is evident from FIG. 3A, the image frame 306 is captured using the same gating rate 224, gate time 220, and number of shutter operations 218 (or "gates") as were used for capturing the image frame 228 within the lighted environment 206 of FIG. 2. However, as is evident from FIG. 3A, the image data 308 resulting from the binary counts (e.g., binary counts 304 for SPAD pixel 212) for forming the image frame 306 provide a noisy representation of the object 204. For example, FIG. 3A illustrates high-frequency noise 310 within the image frame 306, which may at least partially result from dark counts obtained from one or more SPAD pixels of the SPAD array 210 over the large number of shutter operations 218 performed in accordance with the gating rate 224 over the frame capture time period 214.

Accordingly, one aspect of the present disclosure may be regarded as selectively modifying the gating rate in response to changes in environment conditions to at least partially mitigate the accumulation of dark counts.

Figure 3B:
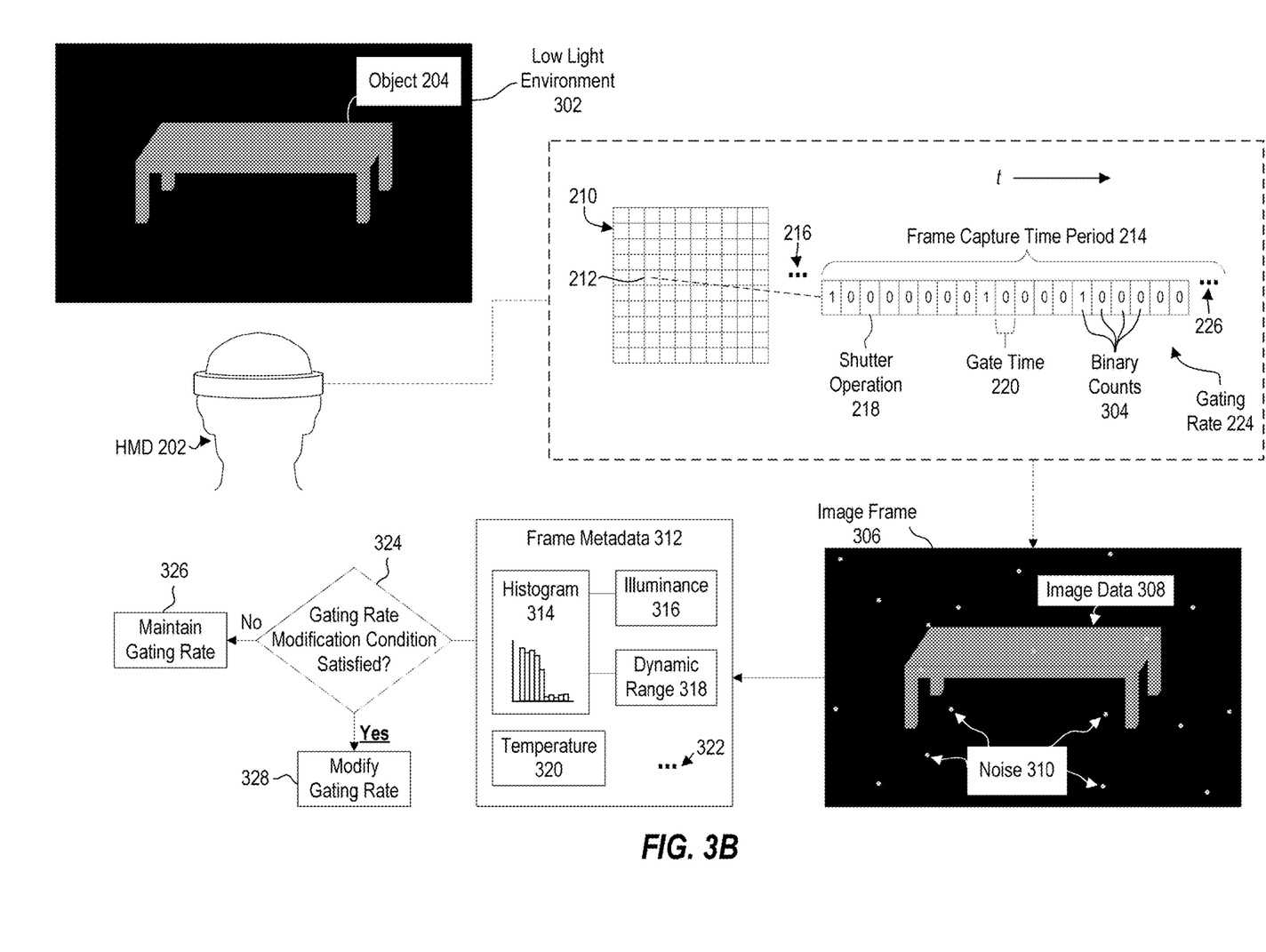
FIG. 3B illustrates a conceptual representation of modifying gating rate based on frame metadata.

For instance, FIG. 3B illustrates an example of obtaining or accessing frame metadata 312 associated with the image frame 306 captured as discussed above with reference to FIG. 3A. The frame metadata 312 may comprise one or more data structures indicative of one or more attributes of a captured scene or environment, such as illuminance 316 and/or dynamic range 318. For example, FIG. 3B illustrates the frame metadata 312 as comprising a histogram 314, which may be indicative of illuminance 316 and/or dynamic range 318 of the captured environment (e.g., the low light environment 302). In some instances, the histogram 314 generated based on the binary counts obtained via the gating operations over the frame capture time period 214 for each SPAD pixel (e.g., binary counts 304 for SPAD pixel 212). For instance, the binary counts for each SPAD pixel may be summed on a per-pixel basis to generate a per-pixel number of detected photons (or detected avalanche events). The SPAD pixels may be binned according to the respective quantity of photons detected by each SPAD pixel (e.g., bin 1=0 to 10 detected photons, bin 2=11-20 detected photons, etc.).

In this way, where a histogram 314 indicates a relatively large proportion of SPAD pixels being associated with low photon counts, the histogram 314 may indicate a low illuminance 316 for the captured scene (e.g., the low light environment 302). Conversely, where a histogram 314 indicates a relatively large proportion of SPAD pixels being associated with high photon counts, the histogram may indicate a high illuminance 316 for the captured scene. The distribution of SPAD pixels among the bins of the histogram 314 may additionally or alternatively indicate dynamic range 318.

In the example shown in FIG. 3B, the histogram 314 associated with the frame metadata 312 of the image frame 306 shows a significant number of the SPAD pixels being associated with lower photon counts, indicating a low illuminance 316 for the scene (in accordance with the low light conditions of the low light environment 302). The histogram 314 of FIG. 3B also indicates a low dynamic range 318 for the captured low light environment 302.

Based on the frame metadata 312, which may be indicative of illuminance 316 and/or dynamic range 318, as discussed above, a system may determine whether and/or how much to modify the gating rate. For instance, FIG. 3B illustrates a decision block 324, wherein a system may determine whether a gating rate modification condition is satisfied. The determination may be made based on the frame metadata 312 for a captured frame (e.g., image frame 306) and/or metadata associated with one or more precedingly captured image frames (e.g., image frame 228). A gating rate modification condition may take on various forms. For example, the gating rate modification condition may be based on whether the frame metadata 312 indicates an illuminance 316 and/or dynamic range that satisfy/satisfies one or more predetermined thresholds and/or is within one or more predetermined ranges of values. By way of non-limiting example, a gating rate modification condition may comprise whether a certain percentage (or number) of SPAD pixels detect a quantity of photons that is below a threshold quantity of photons, or, conversely, whether a certain percentage (or number) of SPAD pixels detect a quantity of photons that is above a threshold quantity of photons. In some instances, the determination of whether a gating rate modification condition is satisfied is further based on metadata associated with one or more precedingly captured image frames (e.g., image frame 228, to determine a change in illuminance or dynamic range between image frame 228 and image frame 306).

FIG. 3B illustrates an act 326 of maintaining the gating rate in response to determining that the gating rate modification condition is not satisfied in accordance with decision block 324. In some instances, when act 326 is performed, the gating rate remains unchanged and one or more additional image frames are captured using the existing gating rate (e.g., gating rate 224).

Conversely, FIG. 3B illustrates an act 328 of modifying the gating rate in response to determining that the gating rate modification condition is satisfied in accordance with decision block 324. In some instances, when act 328 is performed, the gating rate is modified or defined/redefined to tailor the gating rate to imaging conditions (e.g., illuminance conditions, dynamic range conditions, etc.) that are expected to persist while capturing subsequent image frames. For example, when the frame metadata 312 indicates an illuminance 316 and/or a dynamic range 318 that is reduced relative to prior-timepoint image frames, the gating rate may be reduced. As another example, when the frame metadata 312 indicates an illuminance 316 and/or dynamic range 318 that satisfies a predetermined threshold and/or is within a predetermined range of values, the gating rate may be updated to a gating rate that is associated with the predetermined threshold and/or the predetermined range of values. One will appreciate, in view of the present disclosure, that a plurality of gating rates may be predefined and associated with corresponding predetermined thresholds and/or corresponding ranges of values such that the gating rate selected in accordance with act 328 is based on the particular threshold and/or range of values satisfied by the frame metadata 312.

In the example of FIG. 3B, the word "Yes" is emboldened and underlined to indicate that the gating rate modification is satisfied in accordance with decision block 324, triggering performance of act 328 to modify the gating rate. For example, the frame metadata 312 of FIG. 3B may indicate that the illuminance 316 and/or dynamic range associated with the captured scene satisfies a low threshold (in absolute terms, and/or as compared to previously captured image frames such as image frame 228). A system may thus select a reduced gating rate for improving image quality for subsequently captured low light image frames.

Figure 4:
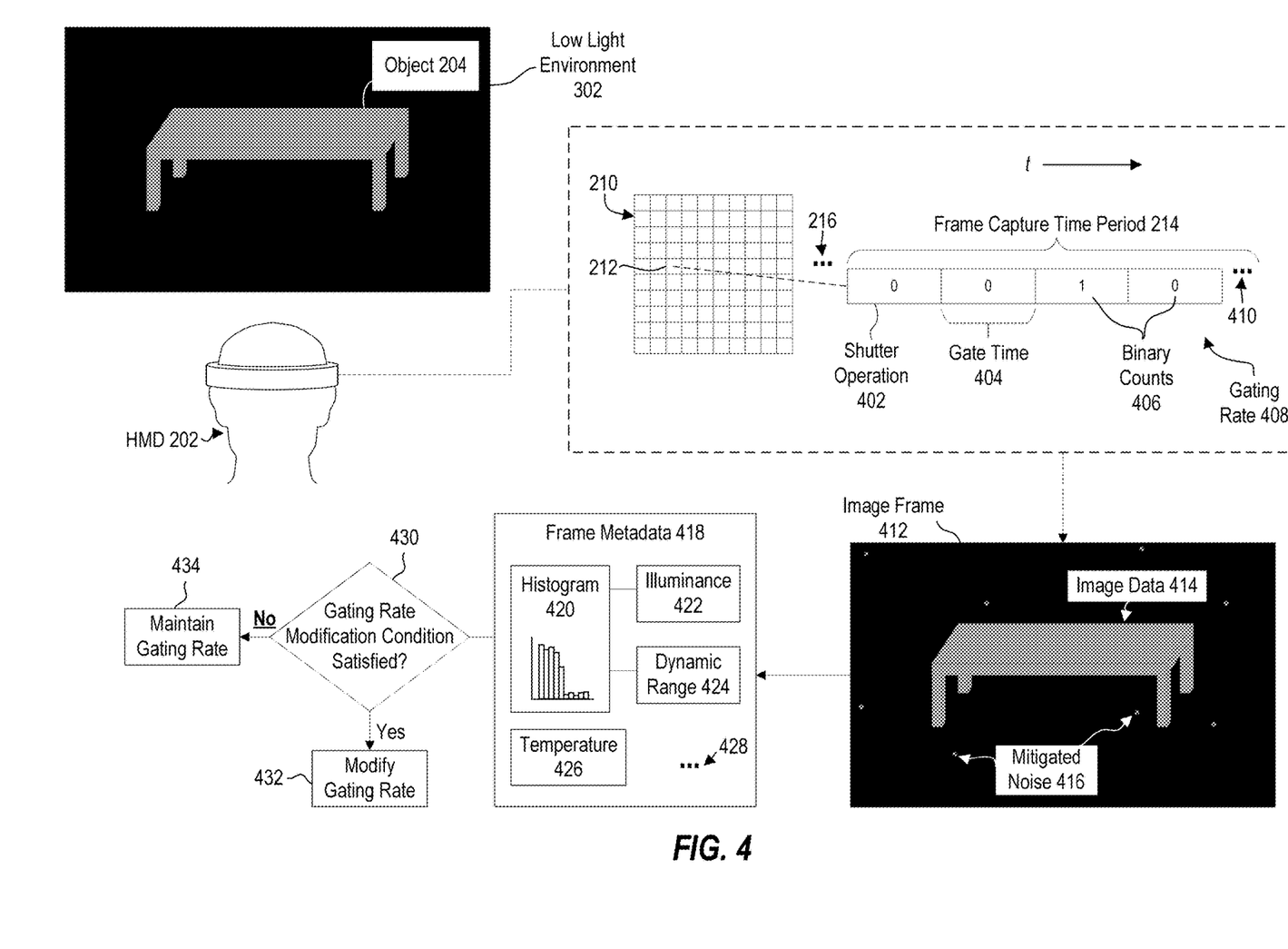
FIG. 4 illustrates an example representation of capturing an image frame of a low light environment utilizing a SPAD array with a modified gating rate.

Before continuing to FIG. 4, although the example of FIG. 3B focuses, in at least some respects, on utilizing illuminance and/or dynamic range as factors for determining whether and/or how much to modify gating rate, additional or alternative factors may be used. For example, FIG. 3B illustrates temperature 320 as part of the frame metadata 312. The temperature 320 may correspond to temperature information associated with the capture of the image frame 306. For example, the temperature 320 may be captured using one or more temperature sensors associated with the SPAD array 210 or, more generally, a computing system (e.g., an HMD) of which the SPAD array is a part. Because dark counts typically increase with device temperature, the temperature 320 may be utilized as an additional or alternative factor for determining whether and/or how much to modify the gating rate. For example, when a high device temperature is detected (in absolute or relative terms, such as by determining that a threshold temperature is satisfied or that a threshold change in temperature has occurred), the gating rate modification condition may be determined to be satisfied, and a reduced gating rate may be selected. Conversely, when a low device temperature is detected, an increased gating rate may be selected. The ellipsis 322 indicates that other additional or alternative factors may be utilized to determine whether and/or how much to modify gating rate (e.g., other types of data indicating illuminance and/or dynamic range aside from image data histograms).

As noted above, after having modified the gating rate, subsequent image frames may be captured using the updated gating rate. FIG. 4 illustrates an example representation of capturing an image frame 412 of the object 204 in the low light environment 302 utilizing the SPAD array 210 with a modified gating rate 408. In the example of FIG. 4, the gating rate 408 was selected in accordance with act 328 based on the gating rate modification condition being satisfied in accordance with decision block 324 discussed above (see FIG. 3B). As illustrated in FIG. 4, capturing the image frame 412 includes applying shutter operations 402 over the frame capture time period. The ellipsis 410 indicates that any number of shutter operations 402 may be performed over the frame capture time period 214. The shutter operations 402 are performed at the modified gating rate 408, resulting in a different (relatively lower) quantity of shutter operations being performed over the frame capture time period 214, and resulting in a different associated gate time 404 for the shutter operations 402. The binary counts 406 obtained from the shutter operations 402 may be used to obtain image data 414 for generating the image frame 412. As shown in FIG. 4, the image frame 412 comprises a representation of the object 204 and the low light environment 302 with mitigated noise 416, which may at least partially result from a reduced number of dark counts being counted by the SPAD pixels of the SPAD array 210 by virtue of the reduced number of gates being performed over the frame capture time period 214 (according to the modified gating rate 408).

In this regard, updating or modifying the gating rate for capturing SPAD imagery may contribute to a reduction in the prevalence of dark counts in the resulting imagery. Furthermore, because the number of recharge clocks applied may be selectively reduced based on imaging conditions, power consumption may also be selectively reduced.

FIG. 4 further illustrates that a system may obtain frame metadata 418 associated with the image frame 412 (or the capturing thereof) to determine if further adjustment of the gating rate is needed. For example, FIG. 4 shows that the frame metadata 418 includes a histogram 420 indicating illuminance 422 and/or dynamic range 424 associated with the image frame 412, as well as temperature 426 and/other factors (indicated by ellipsis 428). A system may assess at least some of the frame metadata 418 to determine whether one or more gating rate modification conditions are satisfied in accordance with decision block 430. In response to determining that the one or more gating rate modification conditions are satisfied, a system may modify the gating rate in accordance with act 432, whereas, in response to determining that the one or more gating rate modification conditions are not satisfied, a system may maintain the gating rate in accordance with act 434. In the example shown in FIG. 4, the system determines that the gating rate 408 used to capture the image frame 412 is appropriate for the detected image conditions (e.g., a low gating rate is used for detected low light conditions, based on the frame metadata 418), and therefore maintains the gating rate, as indicated in FIG. 4 by the emboldened and underlined "No" accompanying act 434.

Although FIGS. 2-4 provide examples in which the same frame capture time period 214 is used for different gating rates 224 and 408, the frame capture time period may, in some instances, be modified for different gating rates.

Figure 5:
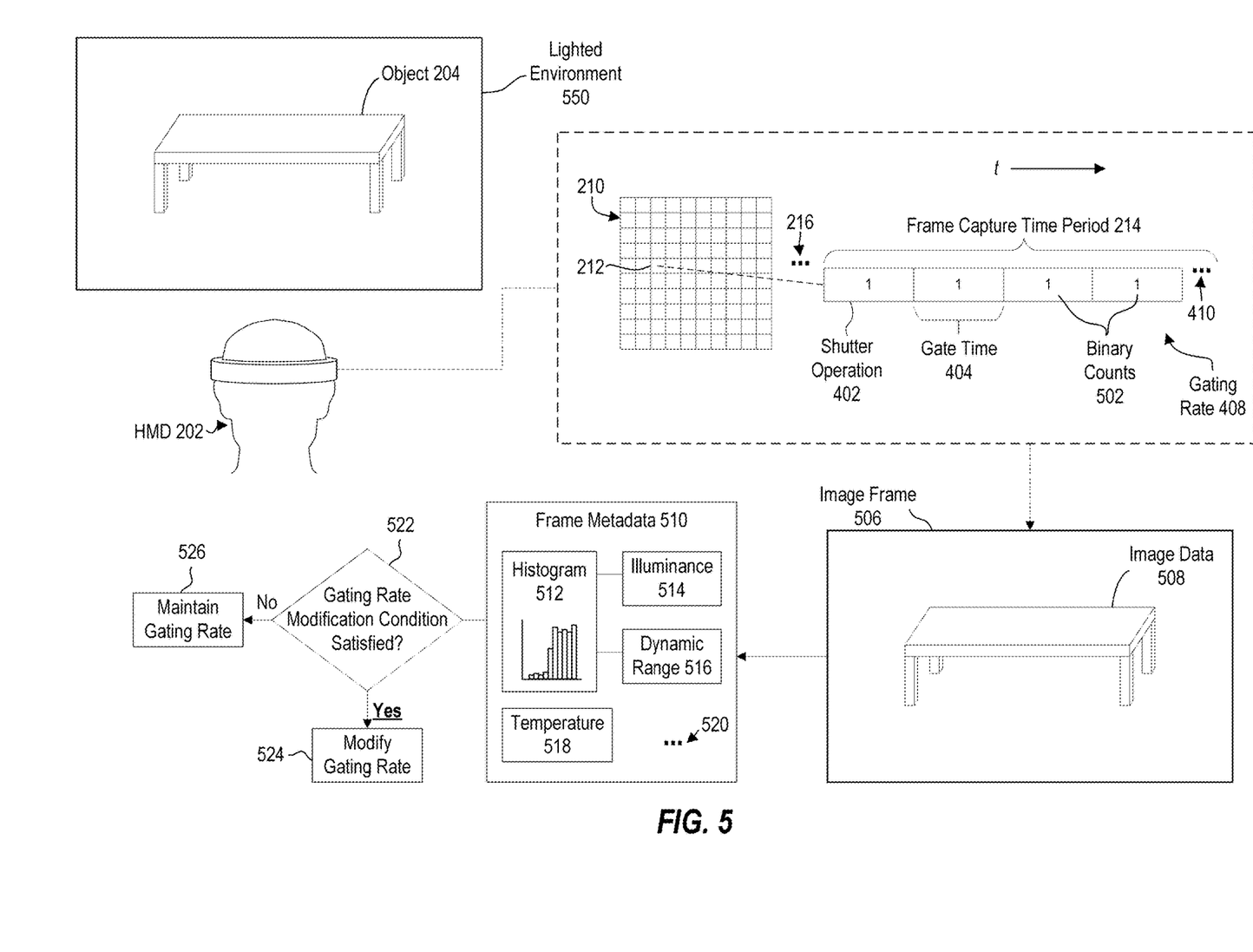
FIG. 5 illustrates an example representation of capturing an image frame of a lighted environment using a SPAD array and determining to further modify gating rate based on frame metadata.

FIG. 5 illustrates an example representation of capturing an image frame of a lighted environment using a SPAD array and determining to further modify gating rate based on frame metadata;

FIG. 5 provides an example of the object 204 within a lighted environment 550. For example, a light source may have turned on within the low light environment 302 of FIGS. 3A-4, resulting in the lighted environment 550 of FIG. 5. FIG. 5 illustrates an image frame 506 of the lighted environment captured using the same modified or reduced gating rate 408 over the frame capture time period 214 as was used to capture image frame 412 from FIG. 4. The binary counts 502 obtained from the shutter operations 402 are used to obtain image data 508 for generating the image frame 506.

In some instances, using a reduced gating rate to capture an environment or scene with high dynamic range or high illuminance may result in an undesirably low bit depth for the image frame. Accordingly, FIG. 5 illustrates frame metadata 510 obtained for the image frame 506, where the frame metadata 510 includes a histogram 512 indicating illuminance 514 and/or dynamic range 516, and/or temperature 518 and/or other factors (indicated by the ellipsis 520). Based on the frame metadata, a system may determine whether one or more gating rate modification conditions are satisfied in accordance with decision block 522. In response to determining that the one or more gating rate modification conditions are satisfied, a system may modify the gating rate in accordance with act 524, whereas, in response to determining that the one or more gating rate modification conditions are not satisfied, a system may maintain the gating rate in accordance with act 526. In the example shown in FIG. 5, the system determines that the gating rate 408 used to capture the image frame 506 is inappropriate for the detected image conditions (e.g., a low gating rate is used for lighted conditions, based on the frame metadata 510), and therefore changes the gating rate, as indicated in FIG. 5 by the emboldened and underlined "Yes" accompanying act 524.

Figure 6:
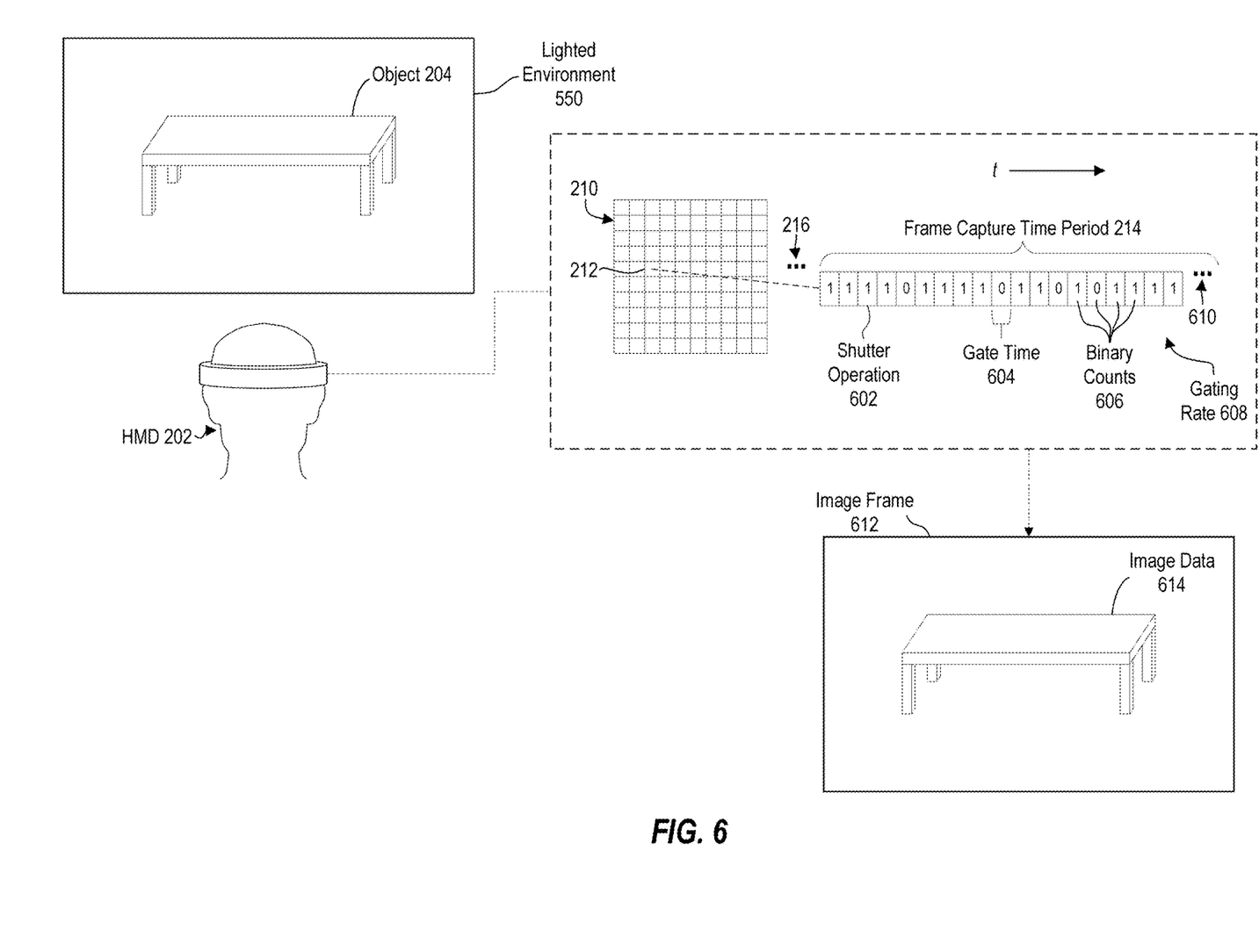
FIG. 6 illustrates an example representation of capturing an image frame of a low light environment utilizing a SPAD array with a further modified gating rate.

FIG. 6 illustrates an example representation of capturing an image frame 612 of the object 204 in the lighted environment 550 utilizing the SPAD array 210 with a modified gating rate 608. In the example of FIG. 6, the gating rate 608 was selected in accordance with act 524 based on the gating rate modification condition being satisfied in accordance with decision block 522 discussed above (see FIG. 5). As illustrated in FIG. 6, capturing the image frame 612 includes applying shutter operations 602 over the frame capture time period 214. The ellipsis 610 indicates that any number of shutter operations 602 may be performed over the frame capture time period 214. The shutter operations 602 are performed at the modified gating rate 608, resulting in a different (relatively higher) quantity of shutter operations being performed over the frame capture time period 214, and resulting in a different associated gate time 604 for the shutter operations 602. The binary counts 606 obtained from the shutter operations 602 may be used to obtain image data 614 for generating the image frame 612. In this way, the gating rate may be selectively modified to attain a desired bit depth (e.g., for high illuminance or high dynamic range scenes).

The relationship between the number of photons absorbed and the number of photons counted by a SPAD pixel is exponential and can be represented as follows:

$$N_{ct} = fT \times \left(1 - e^{-\frac{N_{ph}}{fT}}\right)$$

and, inversely, $$N_{ph} = fT \times \log\left(\frac{fT}{fT - N_{ct}}\right),$$

where $N_{ph}$ represents incident photons, f represents the clock frequency or gating rate, T represents the exposure time or frame capture time period, and $N_{ct}$ represents the output photon counts. The foregoing equations may be used to determine the number of detected photons based on the binary counts (e.g., binary counts 222, 304, 406, 502, 606) obtained according to the corresponding gating rate (e.g., gating rate 224, 408, 608), discussed hereinabove. By utilizing the foregoing functions, photon counting may be adapted for different gating rates associated with different scene dynamic ranges.

One will appreciate, in view of the present disclosure, that frame metadata need not be obtained for all temporally contiguous image frames. For example, frame metadata may be assessed to determine whether one or more gating rate modification conditions are satisfied every 3 frames, 5 frames, 10 frames, 100 frames, etc. Furthermore, in some instances, a gating rate modification may be applied to fewer than all SPAD pixels. For example, different regions of an image frame may be associated with different imaging conditions. Thus, different groups of SPAD pixels may operate with different gating rates to capture the same image frame.

Example Method(s) for Structured Light Depth Computation Using SPADs

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 7:
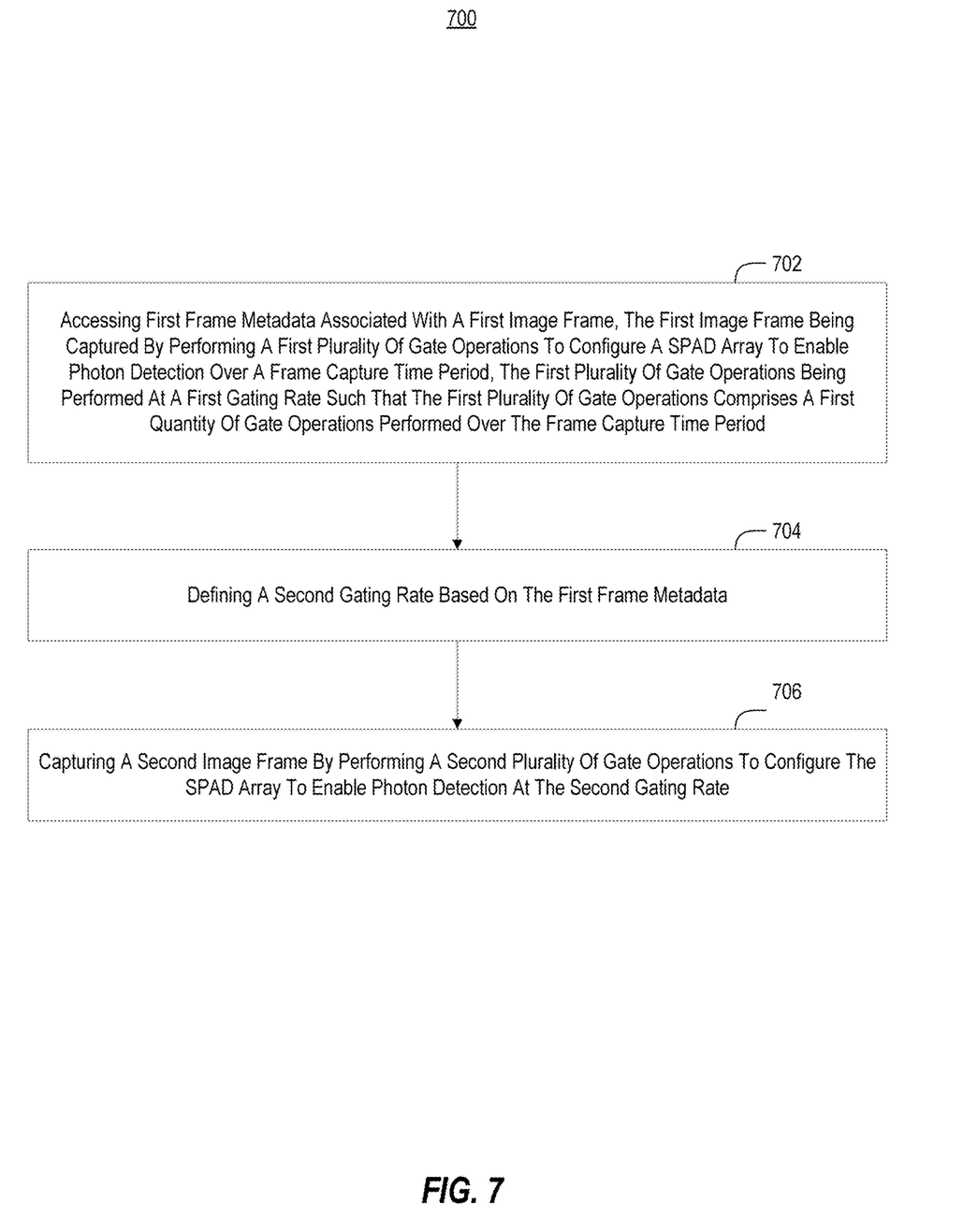
FIG. 7 illustrates an example flow diagram depicting acts associated with selectively modifying gating rate in a SPAD.

FIG. 7 illustrates an example flow diagram 700 depicting acts associated with selectively modifying gating rate in a SPAD. The discussion of the various acts represented in flow diagram 700 include references to various hardware components described in more detail with reference to FIG. 1.

Act 702 of flow diagram 700 includes accessing first frame metadata associated with a first image frame, the first image frame being captured by performing a first plurality of gate operations to configure a SPAD array to enable photon detection over a frame capture time period, the first plurality of gate operations being performed at a first gating rate such that the first plurality of gate operations comprises a first quantity of gate operations performed over the frame capture time period. Act 702 is performed, in some instances, utilizing one or more components of a system 100 (e.g., processor(s) 102, storage 104, sensor(s) 110, SPAD array(s) 112), I/O system(s) 114, communication system(s) 116) and/or other components.

In some instances, the first plurality of gate operations generates, for each SPAD pixel of the SPAD array, a first plurality of binary counts indicating whether a photon was detected during each of the first plurality of gate operations. The first frame metadata may comprise a data structure indicating illuminance or dynamic range of a captured scene. In some implementations, the data structure comprises a histogram based on each of the first pluralities of binary counts for each SPAD pixel of the SPAD array. The histogram may include bins associated with different quantities of detected photons. In some instances, the first frame metadata comprises temperature information associated with the performing of the first plurality of gate operations.

Act 704 of flow diagram 700 includes defining a second gating rate based on the first frame metadata. Act 704 is performed, in some instances, utilizing one or more components of a system 100 (e.g., processor(s) 102, storage 104, sensor(s) 110, SPAD array(s) 112), I/O system(s) 114, communication system(s) 116) and/or other components. In some instances, the second gating rate is associated with a different gate time period than the first gating rate.

In some implementations, the second gating rate is defined to be lower than the first gating rate in response to determining that the first frame metadata indicates a reduction in illuminance or dynamic range relative to a prior-timepoint illuminance or dynamic range. In some instances, the second gating rate is defined to be higher than the first gating rate in response to determining that the first frame metadata indicates an increase in illuminance or dynamic range relative to a prior-timepoint illuminance or dynamic range. In some implementations, the second gating rate is selected based on the first frame metadata indicating that a threshold illuminance or dynamic range is satisfied.

In some implementations, the second gating rate is defined to be lower than the first gating rate in response to determining that the first frame metadata indicates an increase in temperature relative to a prior-timepoint temperature. In some instances, the second gating rate is defined to be higher than the first gating rate in response to determining that the first frame metadata indicates a decrease in temperature relative to a prior-timepoint temperature. In some implementations, the second gating rate is selected based on the first frame metadata indicating that a threshold temperature is satisfied.

Act 706 of flow diagram 700 includes capturing a second image frame by performing a second plurality of gate operations to configure the SPAD array to enable photon detection at the second gating rate. Act 706 is performed, in some instances, utilizing one or more components of a system 100 (e.g., processor(s) 102, storage 104, sensor(s) 110, SPAD array(s) 112), I/O system(s) 114, communication system(s) 116) and/or other components.

In some instances, the second plurality of gate operations performed at the second gating rate causes the second plurality of gate operations to comprise a second quantity of gate operations performed over the frame capture time period. The second quantity of gate operations may be different from the first quantity of gate operations.

In some implementations, fewer than all SPAD pixels of the SPAD array operate at the second gating rate to capture the second image frame.

Utilizing the second gating rate for capturing the second image frame may contribute to reduced power consumption associated with the operating of the SPAD array. Furthermore, utilizing the second gating rate for capturing the second image frame may contribute to a reduction in a prevalence of dark counts in SPAD imagery of the SPAD array.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features andacts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for selectively modifying gating rate in a single photon avalanche diode (SPAD), the system comprising:
    a SPAD array comprising a plurality of SPAD pixels;
    one or more processors; and
    one or more hardware storage devices storing instructions that are executable by the one or more processors to:
    access first frame metadata associated with a first image frame, the first image frame being captured by performing a first plurality of gate operations to configure the SPAD array to enable photon detection over a frame capture time period, the first plurality of gate operations being performed at a first gating rate such that the first plurality of gate operations comprises a first quantity of gate operations performed over the frame capture time period, wherein the first plurality of gate operations generates, for each SPAD pixel of the SPAD array, a first plurality of binary counts indicating whether a photon was detected during each of the first plurality of gate operations, wherein the first frame metadata comprises a histogram indicating illuminance or dynamic range of a captured scene, wherein the histogram is based on each of the first pluralities of binary counts for each SPAD pixel of the SPAD array;
    define a second gating rate based on the first frame metadata; and
    capture a second image frame by performing a second plurality of gate operations to configure the SPAD array to enable photon detection at the second gating rate.

2. The system of claim 1, wherein the second plurality of gate operations performed at the second gating rate causes the second plurality of gate operations to comprise a second quantity of gate operations performed over the frame capture time period, the second quantity of gate operations being different from the first quantity of gate operations.

3. The system of claim 1, wherein the second gating rate is defined to be lower than the first gating rate in response to determining that the first frame metadata indicates a reduction in illuminance or dynamic range relative to a prior-timepoint illuminance or dynamic range.

4. The system of claim 1, wherein the second gating rate is defined to be higher than the first gating rate in response to determining that the first frame metadata indicates an increase in illuminance or dynamic range relative to a prior-timepoint illuminance or dynamic range.

5. The system of claim 1, wherein the second gating rate is selected based on the first frame metadata indicating that a threshold illuminance or dynamic range is satisfied.

6. The system of claim 2, wherein the first frame metadata further comprises temperature information associated with the performing of the first plurality of gate operations.

7. The system of claim 6, wherein the second gating rate is defined to be lower than the first gating rate in response to determining that the first frame metadata indicates an increase in temperature relative to a prior-timepoint temperature.

8. The system of claim 6, wherein the second gating rate is defined to be higher than the first gating rate in response to determining that the first frame metadata indicates a decrease in temperature relative to a prior-timepoint temperature.

9. The system of claim 6, wherein the second gating rate is selected based on the first frame metadata indicating that a threshold temperature is satisfied.

10. The system of claim 1, wherein fewer than all SPAD pixels of the SPAD array operate at the second gating rate to capture the second image frame.

11. The system of claim 1, wherein the second gating rate is associated with a different gate time period than the first gating rate.

12. The system of claim 1, wherein utilizing the second gating rate for capturing the second image frame contributes to reduced power consumption associated with the operating of the SPAD array.

13. The system of claim 1, wherein utilizing the second gating rate for capturing the second image frame contributes to a reduction in a prevalence of dark counts in SPAD imagery of the SPAD array.

14. A method for selectively modifying gating rate in a single photon avalanche diode (SPAD), the method comprising:
    accessing first frame metadata associated with a first image frame, the first image frame being captured by performing a first plurality of gate operations to configure a SPAD array to enable photon detection over a frame capture time period, the first plurality of gate operations being performed at a first gating rate such that the first plurality of gate operations comprises a first quantity of gate operations performed over the frame capture time period, wherein the first frame metadata comprises a data structure indicating dynamic range of a captured scene;
    defining a second gating rate for capturing one or more subsequent image frames based on the data structure indicating dynamic range of the captured scene of the first frame metadata; and
    capturing a second image frame by performing a second plurality of gate operations to configure the SPAD array to enable photon detection at the second gating rate.

15. The method of claim 14, wherein the first plurality of gate operations generates, for each SPAD pixel of the SPAD array, a first plurality of binary counts indicating whether a photon was detected during each of the first plurality of gate operations.

16. The method of claim 14, wherein the second plurality of gate operations performed at the second gating rate causes the second plurality of gate operations to comprise a second quantity of gate operations performed over the frame capture time period, the second quantity of gate operations being different from the first quantity of gate operations.

17. One or more hardware storage devices storing instructions that are executable by one or more processors of a system to configure the system to selectively modify gating rate in a single photon avalanche diode (SPAD) by configuring the system to:
- access first frame metadata associated with a first image frame, the first image frame being captured by performing a first plurality of gate operations to configure a SPAD array to enable photon detection over a frame capture time period, the first plurality of gate operations being performed at a first gating rate such that the first plurality of gate operations comprises a first quantity of gate operations performed over the frame capture time period, wherein the first frame metadata comprises temperature information associated with the performing of the first plurality of gate operations;
- define a second gating rate based on the first frame metadata; and
- capture a second image frame by performing a second plurality of gate operations to configure the SPAD array to enable photon detection at the second gating rate.

* * * * *